Sept. 1, 1936.  H. W. MELCHERS  2,053,199
AUTOMOBILE COOLING SYSTEM CLEANER
Filed Aug. 28, 1935  2 Sheets-Sheet 1
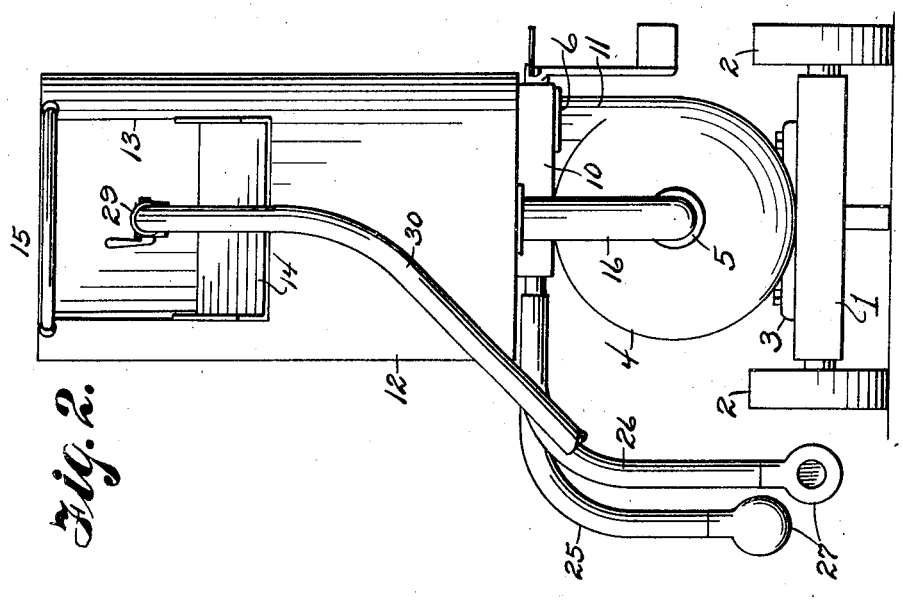
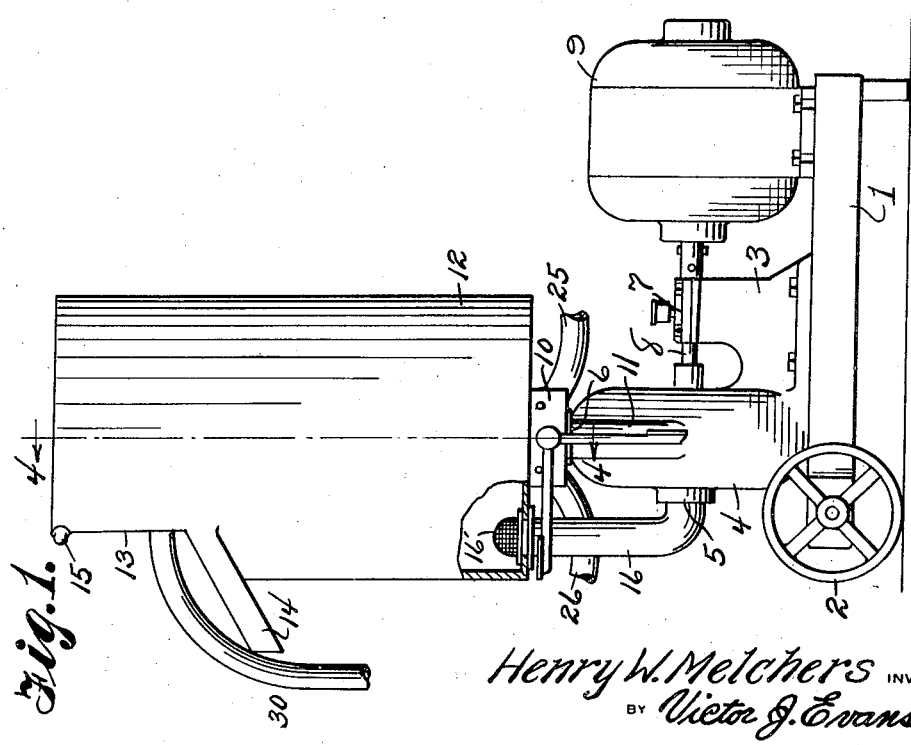
Henry W. Melchers INVENTOR
BY Victor J. Evans & Co.
ATTORNEY Sept. 1, 1936. H. W. MELCHERS 2,053,199
AUTOMOBILE COOLING SYSTEM CLEANER
Filed Aug. 28, 1935 2 Sheets-Sheet 2
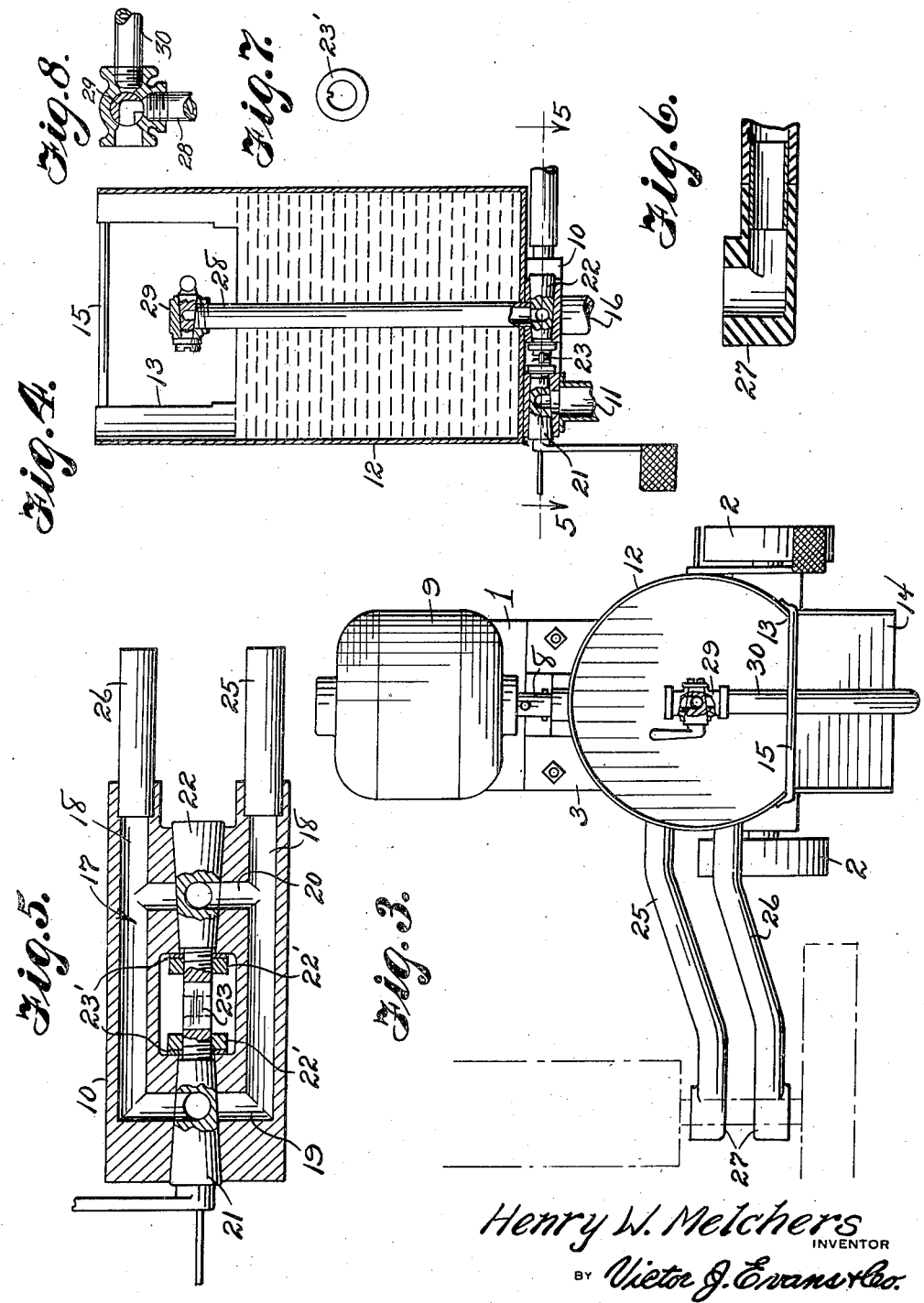
Henry W. Melchers
INVENTOR
BY Victor J. Evans & Co.
ATTORNEY Patented Sept. 1, 1936

2,053,199

UNITED STATES PATENT OFFICE 2,053,199

AUTOMOBILE COOLING SYSTEM CLEANER

Henry W. Melchers, Petersburg, Ill.

Application August 28, 1935, Serial No. 38,336

1 Claim. (Cl. 141—1)

This invention relates to automobile cooling system cleaners and has for the primary object the provision of a portable device of the above stated character which may be readily connected into a cooling system of an automobile which includes a radiator and a cooling jacket of the automobile engine and which will efficiently circulate through the jacket and radiator a cleansing solution taken from a tank forming a part of the device and return the solution to said tank after circulation through the jacket and radiator so that dirt, grease and other foreign matter removed by said solution will be collected in the tank, the grease passing to the surface of the solution in said tank whereby it may be readily removed through the use of a spillway provided on the tank.

Another object of this invention is the provision of means, whereby the direction of the circulation of the solution may be reversed and which also will permit the solution to be dispensed with after the cleansing operation to permit flushing fluid or water to be forced through the cooling system for removing therefrom any remaining foreign matter or any of the cleansing solution, thereby placing the cooling system in condition to provide maximum efficiency.

For a complete understanding of my invention, reference is to be had to the following description and accompanying drawings, in which Figure 1 is a side elevation illustrating an automobile cooling system cleaner constructed in accordance with my invention.

Figure 2 is an end elevation illustrating the same.

Figure 3 is a top plan view, partly in section showing the installation of my invention in an automobile cooling system.

Figure 4 is a fragmentary sectional view taken on the line 4—4 of Figure 1 illustrating the cleaning solution tank.

Figure 5 is a detail sectional view taken on a line 5—5 of Figure 4.

Figure 6 is a detail sectional view showing one of the couplings for connecting this device either to the radiator or cooling jacket of the engine of the automobile.

Figure 7 is a plan view illustrating a washer.

Figure 8 is a detail sectional view showing a control valve having a pair of outlets.

Referring in detail to the drawings, the numeral 1 indicates a portable base equipped with ground wheels 2 for facilitating the movement of the base from one place to another.

A casting 3 is secured to the base 1 and forms an integral part of a conventional type of pump 4 preferably of the centrifugal character, the inlet being indicated at 5 and the outlet at 6. The casting 3 carries a bearing 7 to rotatably support a shaft 8 suitably connected to the pump and to the armature shaft of an electric motor 9, the latter being secured to the base 1.

A valve housing 10 is supported by an outlet pipe 11 forming an integral part of the outlet 6 of the pump. The valve housing 10 is arranged horizontally in a plane above the pump housing and supports a tank 12 open at its upper end and cut away at one side, as shown at 13, to which is connected a downwardly extending trough 14 cooperating with the cutaway portion 13 in forming a spillway for the tank. The tank where cut away is provided with a reinforcing bar 15 acting as a handle to facilitate the movement of the device from one place to another. The tank is filled with a suitable cleaning solution up to the spillway. An outlet pipe 16 is connected to the bottom of the tank and to the inlet 5 of the pump whereby the pump is fed with solution from the tank by gravitation. A screen 16' is placed between the tank and the outlet pipe 16 to prevent sediment collected in the tank from entering the pump. The outlet 6 of the pump is in direct communication with a passage 17 formed in the valve casing. The passage 17 includes spaced parallel legs 18 opening outwardly through one end of the valve housing and connected to one another by passages 19 and 20. The passage 19 is controlled by a valve 21 while the passage 20 is controlled by a valve 22. The valves 21 and 22 are connected by a coupling 23 so that said valves will move in unison. The valve 21 is provided with foot pedals annularly related to one another. The valves 21 and 22 are of the tapered plug type each having a passage provided with angularly related portions. The valves are retained in the housing by nuts 22' and the latter are prevented from loosening or tightening in said valves during the rotation thereof by washers 23'. The valve elements 21 and 22 are reversely arranged to one another. A flexible pipe 25 is connected to one of the legs 18 and a flexible pipe 26 is connected to the other leg 18. The free ends of the pipes 25 and 26 are provided with fittings or couplers 27 capable of frictionally engaging either the outlet of a radiator or the inlet of a cooling jacket of an engine shown in Figure 3.

A standpipe 28 is located in the tank 12 and extends through the bottom of said tank for communication with the passage 20 and is opened and closed by the valve element 22 to said passage 20. The standpipe 28 projects above the spillway and has connected thereto a cutoff valve 29 to which a flexible dispensing pipe 30 is connected. The dispensing pipe 30 extends out of the tank by way of the spillway and is employed for dispensing the contents of the tank when desired and which will be hereinafter more fully described. The control valve 29 is of the two-way type, that is, it has a pair of outlets, one connected to the pipe 30 and the other opening to the interior of the tank so that when fluid is pumped through the pipe 28 it may be directed back into the tank or may be dispensed with by being sent through the pipe 30.

The outlet pipe 6 of the pump is in communication with the passageway 19 and is opened and closed to the latter by the valve element 21. The valve element 21 when in one position will direct fluid from the pump to the leg 18 which has the flexible pipe 25 connected thereto, and another position of said valve element 21 will direct the fluid from the pump to the flexible pipe 26 by way of the other leg 18. Thus it will be seen that the flow of fluid from the pump may be directed to either the pipe 25 or the pipe 26. The valve element 22 being reversely arranged to the valve element 21 will open the standpipe 28 to the leg 18 to which the flow of fluid from the pump is not directed so that the fluid after passing through the cooling system may be returned to the tank or dispensed with by opening the pipe 30 to said standpipe.

In operation, the pipes 25 and 26 are connected to the outlet of the radiator and the inlet of the cooling jacket of an engine of an automobile and with the tank 1 filled with a cleaning solution, the pump is set in operation forcing the cleaning solution through the cooling system either first through the radiator then through the cooling jacket back to the tank or first to the cooling jacket then to the radiator then back to the tank. The direction of this circulation of cleaning solution through the cooling system can be reversed at any time through the manipulation of the foot pedals. The cleaning solution being passed through the cooling system under pressure by the action of the pump removes therefrom dirt, grease, and other foreign matter so that it will collect in the tank when received by the latter, the grease passing to the surface of the cleaning solution. After accumulation of grease on the surface of the solution it may be readily dispensed by way of the spillway by simply adding to or pouring into the tank an additional amount of solution to bring about the flowing of the grease over the spillway.

After thoroughly cleansing the cooling system, the control valve 29 is adjusted to direct the cleaning solution through the pipe 30 from the cooling system so as to bring about an emptying of the tank. A flushing liquid is placed in the tank and the device operated in the same manner as when employing the cleaning solution so as to bring about a thorough removal of any remaining foreign matter in the cooling system or any of the cleaning solution which may have remained therein after the emptying of the tank of said cleaning solution.

Having thus described my invention, I claim:

An automobile cooling system cleaner comprising a tank, a pump connected to said tank to receive a solution therefrom, a reversing valve mechanism connected to said pump, pipes connected to said reversing valve mechanism and adapted to be connected to an automobile cooling system, means for operating the pump, a return pipe from the reversing valve to the tank, and a control valve connected to the return pipe and having a pair of outlets one of which leads to said tank, a dispensing pipe connected to the other outlet of said control valve, and a spillway formed on said tank.

HENRY W. MELCHERS.